United States Patent
D'Oria et al.

(10) Patent No.: US 7,931,767 B2
(45) Date of Patent: Apr. 26, 2011

(54) PROCESS FOR MANUFACTURING ELASTOMERIC COMPONENTS OF A TYRE FOR VEHICLE WHEELS

(75) Inventors: Francesco D'Oria, Milan (IT); Renato Caretta, Milan (IT); Enrico Sabbatani, Milan (IT); Maurizio Marchini, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 544 days.

(21) Appl. No.: 10/560,888

(22) PCT Filed: Jun. 30, 2003

(86) PCT No.: PCT/IB03/02520
§ 371 (c)(1),
(2), (4) Date: May 30, 2006

(87) PCT Pub. No.: WO2005/000559
PCT Pub. Date: Jan. 6, 2005

(65) Prior Publication Data
US 2006/0254694 A1    Nov. 16, 2006

(51) Int. Cl.
*B29D 30/16* (2006.01)
*B29D 30/30* (2006.01)
*B29D 30/60* (2006.01)
*B29C 47/92* (2006.01)

(52) U.S. Cl. .................... 156/117; 156/130; 156/244.11; 156/397; 264/211.23

(58) Field of Classification Search .................. 156/117, 156/130, 397, 244.11; 264/209.8, 211.23
See application file for complete search history.

(56) References Cited

U.S. PATENT DOCUMENTS

| | | | | |
|---|---|---|---|---|
| 1,827,416 A * | 10/1931 | Birdsall | ............................ | 141/1 |
| 2,732,102 A * | 1/1956 | Ekins | ............................ | 222/327 |
| 3,526,929 A * | 9/1970 | Coupland | ..................... | 425/156 |
| 3,782,428 A * | 1/1974 | Cartwright et al. | ........... | 141/115 |
| 3,854,629 A * | 12/1974 | Blieberger | ..................... | 222/109 |
| 5,156,781 A | 10/1992 | Böhm et al. | | |

(Continued)

FOREIGN PATENT DOCUMENTS

EP    1 201 414 A2    5/2002

(Continued)

OTHER PUBLICATIONS

Xanthos, M & Todd, D.B., "Plastics Processing," Kirk-Othmer Encyclopedia of Chemical Technology, Dec. 4, 2000.*

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A process for manufacturing elastomeric components of a tire for a vehicle wheel includes feeding a continuous elongated element from a delivery member by exerting a feeding pressure inside the delivery member, rotating a building support around a geometrical rotation axis of the support, carrying out controlled relative displacements between the delivery member and the support to form a tire component, stopping the feeding of the elongated element when formation of the tire component is complete, and exerting a counter-pressure inside the delivery member after stopping the feeding. Rotating the support assists circumferential distribution of the elongated element on the support. Carrying out controlled relative displacements assists transverse distribution of the elongated element on the support. The tire component is defined by a plurality of coils laid in a pre-established deposition pattern depending on a predetermined cross-section outline to be given to the tire component.

30 Claims, 4 Drawing Sheets

U.S. PATENT DOCUMENTS

| | | | |
|---|---|---|---|
| 2003/0025238 A1* | 2/2003 | Ogawa | 264/211.23 |
| 2005/0017387 A1* | 1/2005 | Harris | 264/40.1 |
| 2005/0183810 A1* | 8/2005 | Abe et al. | 156/117 |

FOREIGN PATENT DOCUMENTS

| | | |
|---|---|---|
| EP | 1 211 050 A2 | 6/2002 |
| EP | 1 211 057 A2 | 6/2002 |
| EP | 1 279 486 A2 | 1/2003 |
| JP | 11-048363 | 2/1999 |
| JP | 2003-266555 | 9/2003 |
| WO | WO 01/36185 A1 | 5/2001 |
| WO | WO-2004/022322 A1 * | 3/2004 |

OTHER PUBLICATIONS

Yokohama Rubber Co LTD, "Shaping of Green Tyre-Involves Forming a Tyre Preform by Adjusting the Extrusion Pressure of Strip Extruder to a Predefined Value by Means of a Valve Formed in the Discharge Part of the Extruder," Derwent Abstract of JP 11-0486363, Derwent Publications Ltd., London, GB, 1 sheet, (Feb. 23, 1999).

* cited by examiner

PROCESS FOR MANUFACTURING ELASTOMERIC COMPONENTS OF A TYRE FOR VEHICLE WHEELS

CROSS-REFERENCE TO RELATED APPLICATIONS

This application is a national-phase entry under 35 U.S.C. §371 from International Application No. PCT/IB2003/002520, filed Jun. 30, 2003, in the International Bureau of the World Intellectual Property Organization, the content of which is relied upon and incorporated herein by reference.

BACKGROUND OF THE INVENTION

1. Field of the Invention

The present invention relates to a process for manufacturing elastomeric components of a tyre for vehicle wheels.

2. Description of the Related Art

Manufacturing of tyres for vehicle wheels involves formation of a carcass structure essentially made up of one or more carcass plies of a substantially toroidal shape and having their axially opposite side edges in engagement with respective annular reinforcing elements usually referred to as "bead cores".

Provided on the carcass structure at a radially external position, is a belt structure comprising one or more belt strips in the form of a closed ring and essentially made up of textile or metallic cords suitably oriented with respect to each other and the cords belonging to adjacent carcass plies.

At a radially external position of the belt structure, a tread band is provided which usually consists of a band of elastomeric material of suitable thickness.

Finally, on the opposite sides of the tyre there is a pair of sidewalls, each of them covering a side portion of the tyre included between a so-called shoulder region disposed close to the corresponding side edge of the tread band, and a so-called bead located at the respective bead core.

To the aims of the present invention it should be pointed out that by the term "elastomeric material" it is intended a composition comprising at least one elastomeric polymer and at least one reinforcing filler. Preferably this composition further comprises additives such as a cross-linking and/or plasticizing agent, for example. Due to the presence of the cross-linking agent, this material can be cross-linked through heating so as to form the final article of manufacture.

Traditional production methods essentially provide for the above listed tyre components to be first made separated from each other, to be then assembled during a tyre building step.

However, there is a general tendency in the present technologies to resort to production methodologies enabling production and storage of semi-finished products to be minimised or possibly eliminated.

For the purpose, manufacturing processes have been proposed that aim at obtaining given tyre components such as tread band, sidewalls or others, by laying onto a toroidal support carrying the tyre being worked, a continuous elongated element of elastomeric material of a reduced section as compared with that of the component to be obtained, which elongated element is such arranged as to form, around the rotation axis of the tyre, a plurality of consecutive coils disposed in side by side and/or overlapped relationship so as to define the component itself in its final configuration.

WO 01/36185 A1 in the name of the same Applicant, discloses a method of manufacturing components of elastomeric material in a tyre for vehicle wheels comprising the steps of: feeding a continuous elongated element from a delivery member disposed close to a toroidal support for application of said elongated element onto the toroidal support itself; giving the toroidal support a rotatory motion around its geometrical rotation axis, so that the elongated element is circumferentially distributed on the toroidal support; carrying out controlled relative displacements for transverse distribution between the toroidal support and the delivery member to form a tyre component with said elongated element which is defined by a plurality of coils laid down in side by side or mutual overlapped relationship according to a preestablished deposition pattern depending on a predetermined cross-section outline to be given to said component. In particular said document teaches that if the peripheral speed of the toroidal support at the point of application of an elongated element is such controlled that a conveniently higher value than the feeding speed of the elongated element itself by the delivery member is maintained, adhesion of the applied elongated element is greatly improved and important advantages in terms of operating flexibility are achieved. In particular, the possibility of conveniently modifying the cross-section sizes of the elongated element is obtained so as to adapt the latter to the thickness of the component to be made, at the different points of the cross-section outline of the component itself.

Document EP 1 279 486 A2 discloses a method of manufacturing a shaped rubber element through extrusion of a strip by an extrusion process comprising a screw extruder, a gear pump and an extruder head having an extrusion nozzle, said units being connected in series with each other. Said method comprises the steps of: feeding a rubber strip onto a rotating support, along a passage extending from said screw extruder to said extrusion nozzle of the extruder head, wherein said passage is substantially a straight passage; and directly or indirectly applying the rubber strip to an outer peripheral surface of the support.

Document EP 1 201 414 A2 discloses a method of manufacturing a tyre comprising: assembling the non-vulcanized rubber components to form a green tyre, vulcanizing the green tyre and wrapping a non-vulcanized rubber strip in such a manner that windings on the whole have a shape of a predetermined cross-section for at least one non-vulcanized rubber component so as to form at least one of the non-vulcanized rubber components.

Document EP 1 211 057 A2 discloses a method of manufacturing a tyre in which, during formation of a green tyre, at least one constituent element, the sidewalls for example, is formed through expansion in a radially external direction of a central portion of a substantially cylindrical carcass band, a non-vulcanized rubber strip being then wound up, junction of the rubber strip taking place on an outer peripheral surface of the expanded carcass band.

SUMMARY OF THE INVENTION

The Applicant could verify that the methods and apparatus of the prior art for building a tyre or manufacturing a component thereof by deposition of elongated elastomeric elements have some drawbacks.

In particular, the Applicant could ascertain that maintaining the elastomeric material features constant when extruded to form the elongated element is of great importance in order to avoid formation of faults and geometric irregularities in the element itself and therefore unevenness in the finished product. The Applicant has found that repeatability of the extruded-material features cannot be easily obtained in particular between a working cycle and the subsequent one, due to the characteristics typical of the elastomeric material used in tyre manufacture.

More specifically, this elastomeric material has a very marked viscoelastic behaviour where the elastic component not only depends on the formulation, but also relies on the process conditions, in particular on temperature and flow rate.

When extrusion is over, i.e. when a working cycle has been completed, both the residual pressure value and the relaxation time of such a pressure mainly depend on the viscoelastic properties of the elastomeric material and the geometry of the extrusion ducts. All these possible variables do not ensure a reproducibility of the extruded product and therefore a good repeatability of the delivery cycles, unless a sufficient time has elapsed after stopping of the delivery member, so as to reach an acceptable value of the residual pressure, in the order of 10-50 bars for example. It is to be noted that this stop time, usually in the order of at least some ten seconds, varies on varying of the viscoelastic features of the elastomeric material employed.

The Applicant realized that by imposing a predetermined pressure drop within a predetermined and very reduced period of time, i.e. in the order of some seconds, not only an optimal reproducibility of the features of the extruded product can be achieved, but in addition this reproducibility can be obtained without substantially stopping delivery of the extruded product for a period longer than the time required for positioning a subsequent tyre in the same working station.

The Applicant realized that during manufacturing of a tyre and in particular building of the sidewalls, tread band or other component of elastomeric material, by deposition of the coils of an elongated elastomeric element disposed in circumferential side by side and/or partial overlapped relationship, at the end of each step of delivering said elongated element a sudden pressure drop is obtained by imposing a counter-pressure inside said delivery member. In this way not only a high constancy in the features of the extruded product is reached, which is indispensable for obtaining tyres the characteristics of which are substantially similar to the nominal design characteristics, but also an optimal management of the working time for each tyre built with an apparatus of high automation is achieved.

Accordingly, in one aspect the invention relates to a process for manufacturing elastomeric components of a tyre for vehicle wheels comprising the steps of:

feeding a continuous elongated element from a delivery member for application of said elongated element onto a building support, by exerting a feeding pressure inside said delivery member;

giving the support a rotatory motion around the geometrical rotation axis thereof, so that the elongated element is circumferentially distributed on the support;

carrying out controlled relative displacements for transverse distribution between said support and said delivery member to form a tyre component with said elongated element which is defined by a plurality of coils laid in a preestablished deposition pattern depending on a predetermined cross-section outline to be given to said component;

stopping said step of feeding said elongated element when formation of said component has been completed;

exerting a counter-pressure inside said delivery member following said stopping step.

In a preferred embodiment of the process in accordance with the invention, said delivery member comprises an extruder screw, a gear pump associated with said extruder screw downstream of the latter and an outlet die associated downstream of said gear pump, said gear pump having a rotation direction of its own during said feeding step.

In a different embodiment of the process in question, when said counter-pressure is exerted, said gear pump carries out a counter-rotation with respect to said rotation direction during said feeding step.

In another embodiment of said process, the time included between stopping of a feeding step and starting of the subsequent one substantially corresponds to the time required for positioning a subsequent tyre under manufacture close to the same delivery member.

BRIEF DESCRIPTION OF THE DRAWINGS

Further features and advantages will become more apparent from the detailed description of some preferred but not exclusive embodiments of a tyre for vehicle wheels in accordance with the present invention.

This description will be set out hereinafter with reference to the accompanying drawings, given by way of non-limiting example, in which.

DETAILED DESCRIPTION OF THE EXEMPLARY EMBODIMENTS

Figure 1:
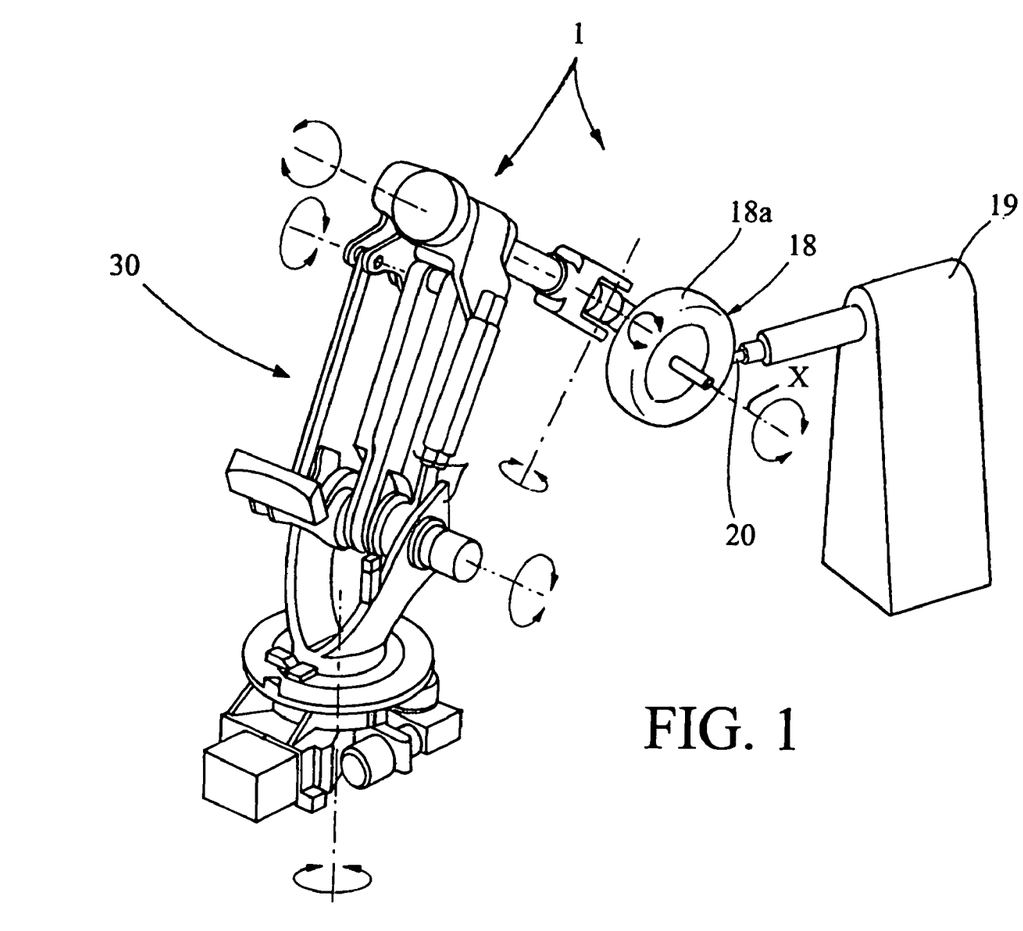
FIG. 1 is a diagrammatic perspective view of an apparatus designed to carry out the process in accordance with the invention.

Referring particularly to FIG. 1, generally denoted at 1 is an apparatus set to manufacture components of elastomeric material in tyres for vehicle wheels by a process in accordance with the present invention.

Figure 4:
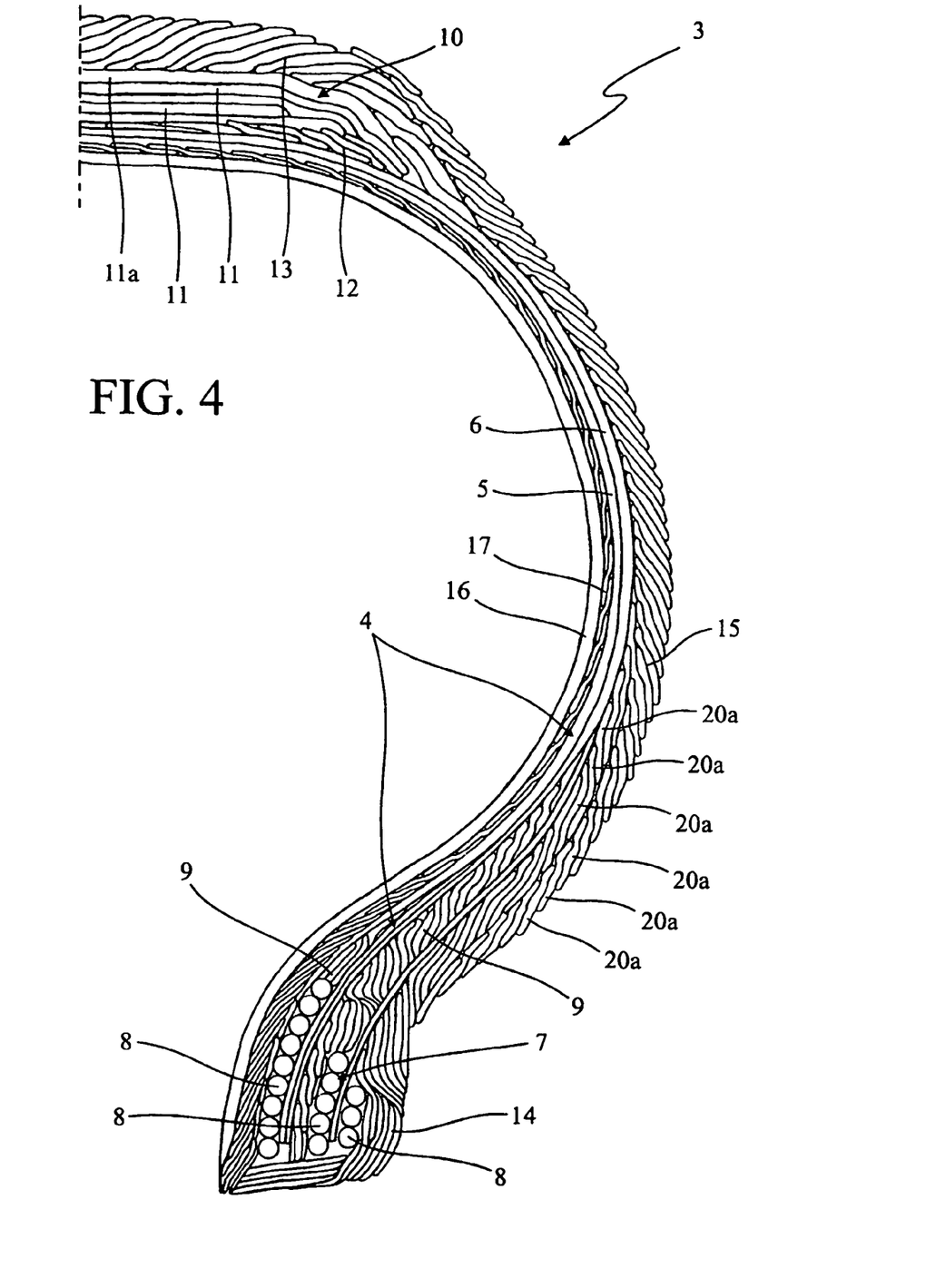
FIG. 4 is a fragmentary cross-section view of a green tyre built following the process in accordance with the present invention.

By way of example, a tyre to be made in accordance with the present invention is generally identified by reference numeral 3 in FIG. 4 and it essentially comprises a carcass structure 4 formed of one or more carcass plies 5, 6 having the respective opposite end flaps fastened to annular reinforcing structures 7 (only one of which is shown in the accompanying figure) integrated into the inner circumferential regions of tyre 3, usually referred to as "beads". Each annular reinforcing structure 7 comprises one or more circumferential annular inserts 8 or bead cores and one or more filling inserts 9 coupled with the carcass plies 5, 6.

A belt structure 10 comprising one or more belt layers 11 having respectively crossed reinforcing cords is applied to the carcass structure 4, at a radially external position thereof, as well as a possible auxiliary belt layer 11a comprising one or more cords of textile material spirally wound up around the geometric axis of tyre 3. Interposed between each of the side edges of the belt structure 10 and the carcass structure 4 is an under-belt insert 12.

Tyre 3 further comprises a tread band 13 applied to the belt structure 10 at a radially external position, a pair of abrasion proof inserts 14 each externally applied close to one of the tyre beads, and a pair of sidewalls 15 each of which covers the carcass structure 4 at a laterally external position.

The carcass structure 4 can be internally coated with a so-called liner 16, i.e. a thin layer of elastomeric material that, when vulcanisation has been completed, will be airtight so as to ensure maintenance in use of the tyre's inflating pressure. In addition, a so-called under-liner 17 of elastomeric material may be interposed between liner 16 and the carcass plies 5, 6.

Apparatus 1 lends itself to be part of a plant not shown, designed to produce tyres for vehicle wheels or to execute some of the working operations provided in the tyre manufacturing cycle.

Within these working operations all components of tyre 3 to be obtained can be conveniently provided to be directly manufactured on a building support 18 having an outer surface 18a substantially conforming in shape to the inner configuration of the tyre to be formed. In a particular embodiment, said building support 18 is a substantially rigid toroidal support.

In a different embodiment, said support 18 has a varying surface configuration, which may range from a substantially cylindrical to a substantially toroidal one, and supports at least one carcass structure previously built on a building drum following traditional building methods starting from semifinished products previously manufactured and stored.

In a further embodiment said support 18 has a substantially cylindrical outer surface 18a on which first at least one element of the tyre under manufacture is assembled, a belt structure for example the components of which have been previously manufactured and stored following said traditional building methods.

Said plant generally comprises a plurality of work stations (only one of which is shown) each assigned to execution of at least one of the working operations aiming at building the tyre on the toroidal support. Such a plant is described in document WO 01/32409 in the name of the same Applicant, for example.

One or more apparatus 1 can be associated with the different work stations so as to form, in accordance with the process in reference, one or more of the components of elastomeric material of tyre 3, such as the filling inserts 9 of the annular reinforcing structures 7, under-belt inserts 12, tread band 13, abrasion proof inserts 14, sidewalls 15, liner 16 and underliner 17.

As shown in FIG. 1, apparatus 1 comprises at least one delivery member 19 set to operate close to the building support 18 to feed at least one continuous elongated element 20 towards the outer surface 18a of the support itself.

In a preferential embodiment, such a delivery member 19 is essentially defined by a positive-displacement extruder set to operate in close proximity to the toroidal support 18 to deliver the continuous elongated element 20 directly either against the outer surface 18a or against the component previously formed on the toroidal support or under formation thereon.

Figure 3:
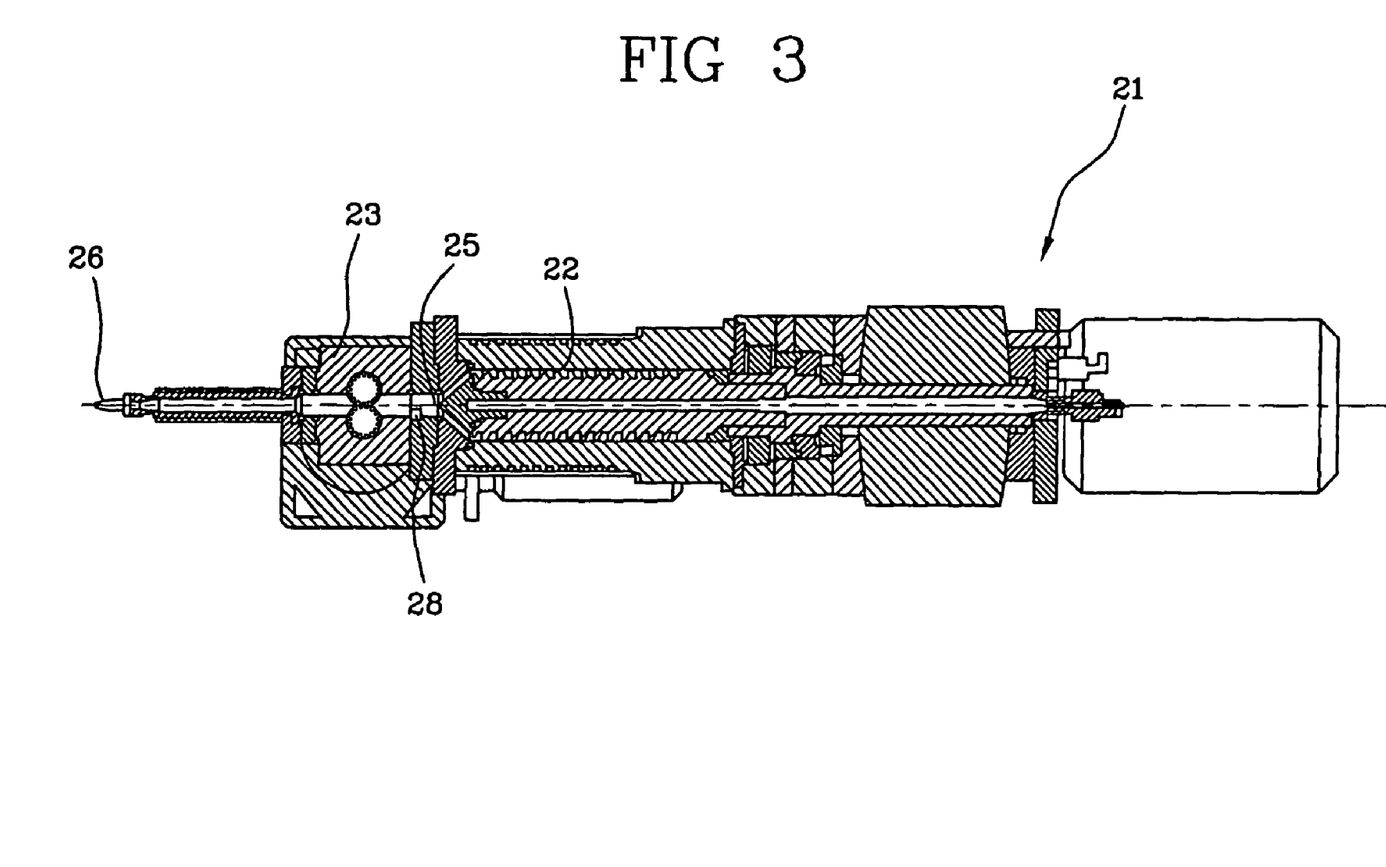
FIG. 3 is a partial top view partly in section of a delivery member belonging to said apparatus.

Said positive-displacement extruder denoted at 21 is provided with a so-called outlet "die" 26 passed through by the product being worked at an orifice conveniently shaped and sized depending on the geometric and dimensional features to be given to the product itself.

Advantageously, the positive-displacement extruder 21 comprises at least one extrusion screw 22 to work the elastomeric material, operatively associated with a gear pump 23. More specifically, the extrusion screw 22 over the whole longitudinal length thereof, carries out working of the elastomeric material introduced thereinto through a load opening (not shown in the drawings) until bringing it to a collecting chamber 25 upstream of said gear pump 23. Therein, a pressure sensor 28 or a device equivalent thereto operates said gear pump on achievement of a pressure included between approximately 80 and 250 bars, preferably a pressure of about 150 bars.

The gear pump 23 by a rotation direction of its own, increases the elastomeric-material pressure until bringing it to values included between about 200 and about 650 bars, preferably to about 400 bars, said elastomeric material being finally extruded towards the building support 18 through said die 26.

Said extrusion screw 22 and gear pump 23 are each preferably driven by different power units, although said power units can be also replaced by a single power unit.

The continuous elongated element 20 is preferably made up of an elongated element of elastomeric material of flattened section, a rectangular, elliptic or lenticular section for example, the cross-section sizes of which are greatly reduced as compared with the cross-section sizes of the component that is wished to be made. By way of example, the continuous elongated element 20 may have a width included just as an indication between 3 millimeters and 15 millimeters, and a thickness included just as an indication between 0.5 millimeters and 2 millimeters.

One of the components previously identified by reference numerals 9, 12, 13, 14, 15, 16, 17, is obtained in its final configuration by delivering the elongated element 20 to support 18, while a rotatory motion is given to said support for circumferential distribution of the elongated element around a geometric rotation axis of the support itself identified by "X", i.e. of such a nature to enable the elongated element to be circumferentially distributed.

Concurrently with the rotation imposed to the building support 18, transverse-distribution devices to be better described in the following carry out controlled relative displacements between the support itself and the delivery member 19, in such a manner that the elongated element 20 forms a series of coils 20a disposed in a radial and/or axial side by side relationship following a preestablished deposition pattern depending on a predetermined cross-section outline to be given to the component being made.

In accordance with a preferential embodiment of the present invention, both the rotatory motion for circumferential distribution, i.e. rotation of support 18 around its axis "X", and the controlled relative displacements for transverse distribution are achieved by directly moving support 18.

For the purpose it is provided that the devices designed to drive support 18 in rotation around its axis "X" and the devices designed to carry out displacements for transverse distribution should be integrated into at least one robotized arm generally identified by 30 and set to removably engage support 18 to sequentially bring it in front of each of the work stations provided in the above mentioned plant and conveniently move it in front of the respective delivery members 19.

It should be recognised that the wide freedom of movement given to support 18 according to six swinging axes as shown in the above mentioned document WO 01/36185 in the name of the same Applicant, as well as driving in rotation of said support around the geometric axis "X" enable a correct deposition of the elongated element 20 coming from extruder 21 to be carried out, irrespective of the conformation of the support 18 and the component to be obtained.

Note that each tyre being worked and supported by said support 18, when building of one of the above listed tyre components (identified by reference numerals 9, 12, 13, 14, 15, 16, 17) has been completed, is moved away from extruder 21 so that working of same can be continued in a subsequent work station, while at the same time a new tyre on which the same component is to be built is disposed close to extruder 21 that will subsequently repeat the step of feeding said elongated element.

Between moving away of a tyre under working and arrival of the subsequent tyre, the step of feeding the elastomeric material extruded from extruder 21 is stopped. Under these conditions, the Applicant could observe that, should the gear pump be merely stopped, some phenomena would take place inside the delivery member 19, such as: leakage of elastomeric material from the end of die 26; difficult restarting to the subsequent feeding step, with possibility of clots at the exit; long time gap (usually longer than 30 seconds) to bring back the elastomeric-material pressure to the required optimal values (preferably from about 10 to about 50 bars) for starting the subsequent feeding step.

The Applicant realized that, when the gear pump is at a standstill, in order to keep the characteristics of said material substantially unchanged it is necessary to carry out a machine stop of at least 30-40 seconds, which time, on the other hand, varies depending on the extruded elastomeric material and the extruder model. Said machine stop inevitably immediately affects the efficiency of the whole production plant.

Advantageously, in accordance with the invention, the Applicant has provided a counter-pressure step at the end of each feeding step by each extruder, preferably carried out by a counter-rotation of said gear pump, i.e. a rotation in the opposite direction to the rotation direction of the pump during the feeding step.

Figure 2:
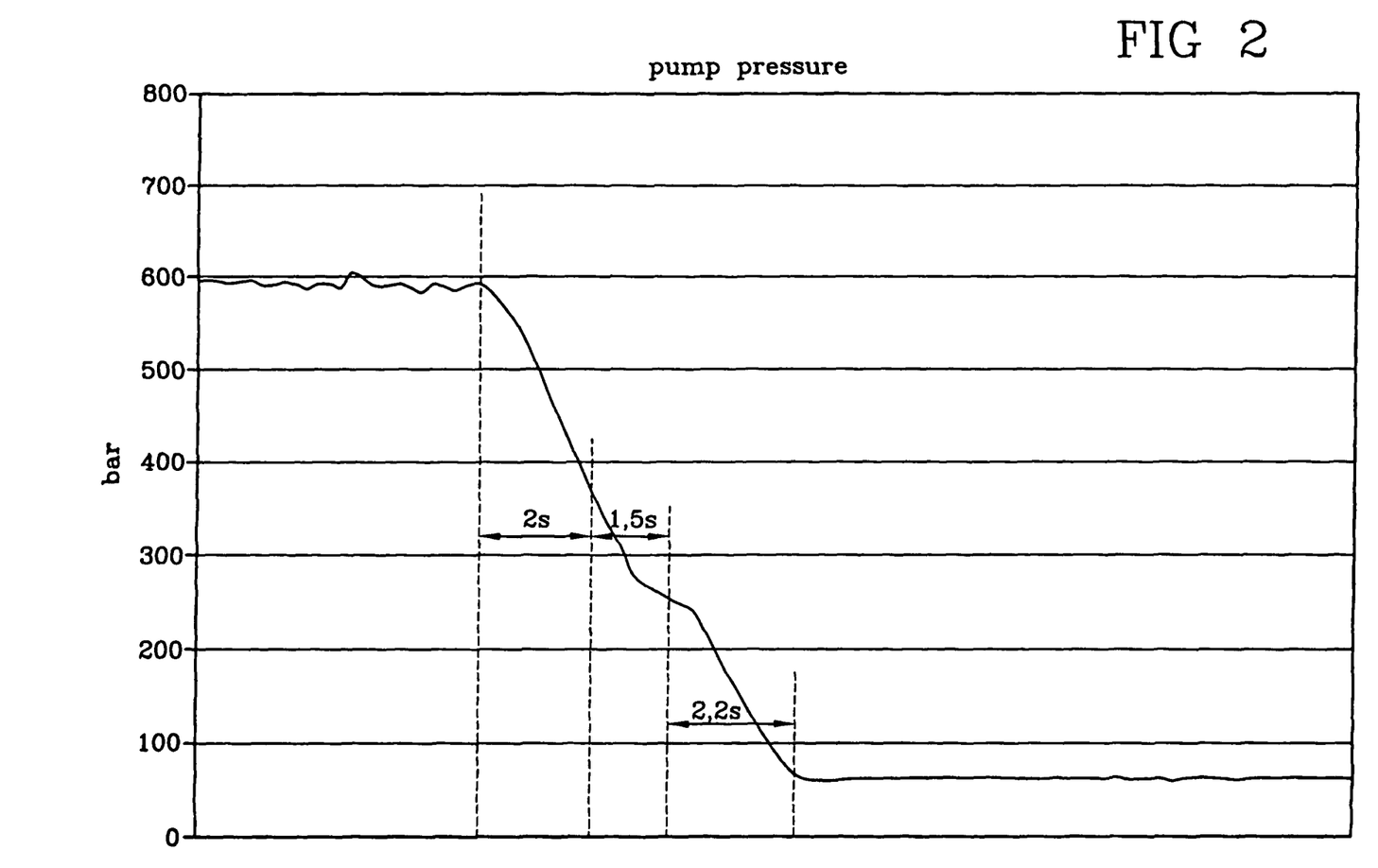
FIG. 2 is a graph showing pressure variations vs. time, downstream of a gear pump belonging to a delivery member of the apparatus shown in FIG. 1.

More specifically, in a preferred embodiment of the process of the invention, diagrammatically shown in FIG. 2, at the end of the feeding step, stopping of the gear pump takes place within a period of time included between about 0.1 second and about 8 seconds, preferably in a period of time included between about 1 second and about 3 seconds (2 seconds in FIG. 2); during the same time gap pressure downstream of the pump decreases from about 550-650 bars to about 150-400 bars. Subsequently, after a stop time varying between about 0.1 second and about 3 seconds, preferably of about 2 seconds (1.5 second in FIG. 2), during which time pressure downstream of the pump further decreases to about 150-200 bars, the pump is driven to rotate in the opposite direction relative to the feeding step over a period of time of about 1 second to about 5 seconds, preferably in the range of 2 to 3 seconds (2.2 seconds in FIG. 2). The residual pressure downstream of the gear pump will be included between about 10 to about 50 bars, and will preferably be of about 25 bars. Therefore the ideal conditions exist for a new feeding step after a period of time included between about 1.2 second and about 16 seconds, preferably between about 5 seconds and about 8 seconds.

Preferably, said time gap between two subsequent feeding steps substantially corresponds to the time required for moving from said delivery member 19, a building support carrying a tyre on which a component has been just formed during the preceding feeding step, and moving close to said delivery member 19, a further building support carrying a different tyre in order to form the same component or a different component of the tyre itself.

According to a preferred modality of putting the process in reference into practice, said rotation step of the gear pump in the opposite direction is carried out by a rotation of the pump gears included between an angle of about 10° and an angle of about 40°; in this manner the phenomena related to recirculation of the elastomeric material are very limited and do not trigger phenomena that may bring to an extruded product of varying and therefore undesirable characteristics.

The process in accordance with the invention therefore makes it possible to quickly achieve those pressure values downstream of the gear pump that allow a quick restoration of pressure conditions enabling repetition of a feeding step that will give an extruded product having the same features as those exhibited in the preceding feeding step. Consequently, also substantially eliminated are such undesirable phenomena as formation of clots in the extruded product or blend escape from die 26 downstream of the pump.

The invention claimed is:

1. A process for manufacturing elastomeric components of a tyre for a vehicle wheel, the process comprising:
    feeding a continuous elongated element from a delivery member by exerting a feeding pressure on an elastomeric material inside the delivery member, the delivery member comprising a pear pump rotating in a first direction during feeding;
    rotating a building support around a geometrical rotation axis of the building support;
    carrying out controlled relative displacements between the delivery member and the building support to form a tyre component;
    stopping the feeding of the elongated element when formation of the tyre component is complete by bringing the gear pump to a standstill;
    after bringing the pear pump to a standstill, maintaining the pear pump at a standstill for a first predetermined period of time; and
    after maintaining the gear pump at a standstill for the first predetermined period of time, exerting a counter-pressure inside the delivery member by rotating the pear pump in a second direction, opposite the first direction, for a second predetermined period of time such that the pressure inside the delivery member drops to between about 10 bars and about 50 bars, wherein the first predetermined period of time, the counter-pressure and the second predetermined period of time are predetermined to result in the elastomeric material inside the delivery member reaching a sufficient pressure to ensure reproducibility of the elongated element;
    wherein feeding the elongated element assists application of the elongated element onto the building support,
    wherein rotating the building support assists circumferential distribution of the elongated element on the building support,
    wherein carrying out controlled relative displacements assists transverse distribution of the elongated element on the building support, and
    wherein the tyre component is defined by a plurality of coils laid in a preestablished deposition pattern depending on a predetermined cross-section outline to be given to the tyre component.

2. The process of claim 1, wherein the delivery member further comprises:
    an extrusion screw associated with the near pump, upstream of the gear pump; and
    an outlet die associated downstream of the gear pump.

3. The process of claim 2, wherein stopping the feeding comprises bringing the gear pump to a standstill in a period of time greater than or equal to about 0.1 seconds and less than or equal to about 8 seconds.

4. The process of claim 2, wherein during stopping the feeding, pressure downstream of the gear pump decreases to a value greater than or equal to about 150 bars and less than or equal to about 400 bars.

5. The process of claim 3, wherein maintaining the gear pump at a standstill comprises the gear pump remaining at a standstill for a period of time greater than or equal to about 0.1 seconds and less than or equal to about 3 seconds.

6. The process of claim 5, wherein while the gear pump remains at a standstill, pressure downstream of the gear pump decreases to a value greater than or equal to about 150 bars and less than or equal to about 200 bars.

7. The process of claim 1, wherein the rotating of the gear pump in the second direction is carried out for a period of time greater than or equal to about 1 second and less than or equal to about 5 seconds.

8. The process of claim 1, wherein during the rotating of the gear pump in the second direction, the gears of the gear pump rotate through an angle greater than or equal to about 10° and less than or equal to about 40°.

9. The process of claim 1, wherein at the end of the rotating of the gear pump in the second direction, pressure downstream of the gear pump is greater than or equal to about 10 bars and less than or equal to about 50 bars.

10. The process of claim 1, wherein feeding the elongated element restarts after a time gap greater than or equal to about 1.2 seconds and less than or equal to about 16 seconds from stopping the feeding of the elongated element.

11. The process of claim 10, wherein the time gap substantially corresponds to a time required for positioning a subsequent tyre being built close to the delivery member.

12. The process of claim 1, wherein the building support is a substantially rigid toroidal support.

13. The process of claim 1, wherein the building support comprises a varying surface configuration.

14. The process of claim 13, wherein the surface configuration varies from a substantially cylindrical configuration to a substantially toroidal configuration.

15. The process of claim 1, wherein the building support comprises a substantially cylindrical outer surface.

16. The process of claim 1, wherein the feeding pressure inside the delivery member is greater than or equal to about 200 bars and less than or equal to about 650 bars.

17. A process for manufacturing elastomeric components of a tyre for a vehicle wheel, the process comprising:
    feeding a continuous elongated element from a delivery member by exerting a feeding pressure on an elastomeric material inside the delivery member, the delivery member comprising a gear pump rotating in a first direction during feeding;
    rotating a building support around a geometrical rotation axis of the building support;
    carrying out controlled relative displacements between the delivery member and the building support to form a tyre component;
    stopping the feeding of the elongated element when formation of the tyre component is complete by bringing the gear pump to a standstill;
    after bringing the gear pump to a standstill, maintaining the gear pump at a standstill for a first predetermined period of time; and
    after maintaining the gear pump at a standstill for the first predetermined period of time, exerting a counter-pressure inside the delivery member by rotating the gear pump in a second direction, opposite the first direction, for a second predetermined period of time, wherein the first predetermined period of time, the counter-pressure and the second predetermined period of time are predetermined to result in the elastomeric material inside the delivery member reaching a sufficient pressure to ensure reproducibility of the elongated element;
    wherein feeding the elongated element assists application of the elongated element onto the building support,
    wherein rotating the building support assists circumferential distribution of the elongated element on the building support,
    wherein carrying out controlled relative displacements assists transverse distribution of the elongated element on the building support, and
    wherein the tyre component is defined by a plurality of coils laid in a preestablished deposition pattern depending on a predetermined cross-section outline to be given to the tyre component,
    wherein feeding the elongated element restarts after a time gap substantially corresponding to a time required for positioning a subsequent tyre being built close to the delivery member.

18. The process of claim 17, wherein the delivery member further comprises:
    an extrusion screw associated with the gear pump, upstream of the gear pump; and
    an outlet die associated downstream of the gear pump.

19. The process of claim 18, wherein stopping the feeding comprises bringing the gear pump to a standstill in a period of time greater than or equal to about 0.1 seconds and less than or equal to about 8 seconds.

20. The process of claim 18, wherein during stopping the feeding, pressure downstream of the gear pump decreases to a value greater than or equal to about 150 bars and less than or equal to about 400 bars.

21. The process of claim 19, wherein maintaining the gear pump at a standstill comprises the gear pump remaining at a standstill for a period of time greater than or equal to about 0.1 seconds and less than or equal to about 3 seconds.

22. The process of claim 21, wherein while the gear pump remains at a standstill, pressure downstream of the gear pump decreases to a value greater than or equal to about 150 bars and less than or equal to about 200 bars.

23. The process of claim 17, wherein the rotating of the gear pump in the second direction is carried out for a period of time greater than or equal to about 1 second and less than or equal to about 5 seconds.

24. The process of claim 17, wherein during the rotating of the gear pump in the second direction, the gears of the gear pump rotate through an angle greater than or equal to about 10° and less than or equal to about 40°.

25. The process of claim 17, wherein at the end of the rotating of the gear pump in the second direction, pressure downstream of the gear pump is greater than or equal to about 10 bars and less than or equal to about 50 bars.

26. The process of claim 17, wherein the time gap is greater than or equal to about 1.2 seconds and less than or equal to about 16 seconds from stopping the feeding of the elongated element.

27. The process of claim 17, wherein the building support is a substantially rigid toroidal support.

28. The process of claim 17, wherein the building support comprises a varying surface configuration.

29. The process of claim 28, wherein the surface configuration varies from a substantially cylindrical configuration to a substantially toroidal configuration.

30. The process of claim 17, wherein the building support comprises a substantially cylindrical outer surface.

* * * * *

UNITED STATES PATENT AND TRADEMARK OFFICE
CERTIFICATE OF CORRECTION

PATENT NO. : 7,931,767 B2  Page 1 of 1
APPLICATION NO. : 10/560888
DATED : April 26, 2011
INVENTOR(S) : D'Oria et al.

It is certified that error appears in the above-identified patent and that said Letters Patent is hereby corrected as shown below:

Claim 1, column 8, line 12, "pear pump" should read --gear pump--.

Claim 1, column 8, line 22, "pear pump" should read --gear pump--.

Claim 1, column 8, line 23, "pear pump" should read --gear pump--.

Claim 1, column 8, lines 27-28, "pear pump" should read --gear pump--.

Claim 2, column 8, line 51, "near pump," should read --gear pump,--.

Signed and Sealed this
Twenty-fifth Day of October, 2011

David J. Kappos
*Director of the United States Patent and Trademark Office*